(12) United States Patent
Watts (10) Patent No.: US 6,682,101 B2
(45) Date of Patent: Jan. 27, 2004

(54) WEDGETHREAD PIPE CONNECTION

(75) Inventor: John Dawson Watts, Austin, TX (US)

(73) Assignee: Beverly Watts Ramos, Austin, TX (US)

( * ) Notice: Subject to any disclaimer, the term of this patent is extended or adjusted under 35 U.S.C. 154(b) by 121 days.

(21) Appl. No.: 10/254,817

(22) Filed: Sep. 25, 2002

(65) Prior Publication Data

US 2003/0168859 A1 Sep. 11, 2003

Related U.S. Application Data

(63) Continuation-in-part of application No. 10/092,173, filed on Mar. 6, 2002, now abandoned.

(51) Int. Cl.$^7$ ............................. F16L 7/00; F16L 25/00
(52) U.S. Cl. .......................... 285/94; 285/334; 285/390
(58) Field of Search ...................... 285/94, 333, 334, 285/355, 390

(56) References Cited

U.S. PATENT DOCUMENTS

| | | | | |
|---|---|---|---|---|
| 4,692,988 A | * | 9/1987 | Shulver et al. ................ 29/458 |
| RE34,467 E | * | 12/1993 | Reeves ........................ 285/334 |
| 5,360,239 A | * | 11/1994 | Klementich ................... 285/94 |
| 5,360,240 A | * | 11/1994 | Mott ........................... 285/95 |
| 5,427,418 A | * | 6/1995 | Watts ........................... 285/94 |
| 5,431,831 A | * | 7/1995 | Vincent ........................ 508/116 |
| 5,649,725 A | * | 7/1997 | Nagasaku et al. ........... 285/334 |
| 6,050,610 A | * | 4/2000 | Enderle et al. ................ 285/94 |

* cited by examiner

Primary Examiner—Eric K. Nicholson

(57) ABSTRACT

A high strength Wedgethread Pipe Connection having a ratio of the radius change per turn to the thread width change per turn, as is required to maintain both a thread seal and tightness, even when the connection is subjected to transient service loads such as vibrations, shock, bending, tension, compression, torsion and/or thermal changes. The thread form may be Open or Trapped for use on large or small diameter pipe, configured such as: a flush joint; with collars of larger diameter than the pipe; with double-pin couplings; tool and accessory connections; or it may also be used to reversibly connect such as solid structural posts to base members where a wide range of repeatable makeup torque is desired. The threads have provisions for ease of manufacture and assembly, and to minimize handling damage. The connection has a very high torque capacity without need for shoulders, and it can be repeatedly "spun-up" and tightened over a wide torque range, without significant change in the final makeup position. The connection has a very high tension, compression and bending strength, relative to the pipe. The connection may be furnished in high strength configurations such as integral flush joints, near-flush, box couplings, double pin couplings, and even as structural post connections. Thread dope requirements for use with a given connection are included.

27 Claims, 3 Drawing Sheets

WEDGETHREAD PIPE CONNECTION

This Application is a C-I-P of: U.S. patent application Ser. No. 10/092,173 filed Mar. 6, 2002, now abandoned.

TECHNICAL FIELD

The use of screw threads to connect joints of pipe together so as to convey fluid, is a very old art that has progressed for hundreds of years in an effort to satisfy periodic needs for stronger and better sealing pipe connections. Performance requirements for pipe connections still vary widely, such as for home piping containing less than 80 psi fluid pressure with virtually no mechanical loads, to Oil Well Pipe that may be required to hold 15,000 psi gas pressure, and simultaneously withstand extreme mechanical loadings and wide temperature fluctuations. The use of pipe threads to connect structural members is also old art.

Due to the historical weakness of threaded pipe connections and their tendency to loosen, leak, and/or break, their use in industrial plants and refineries has been limited by Industrial Codes, to very small pipe sizes and low pressures. However, because there is no reasonable alternative pipe connection for use within the very limited hole sizes drilled for Oil & Gas Wells, threaded pipe connections are still used today in wells, so most research on and development of threaded pipe connections has been directed toward such use. Structural use of conventional pipe threads has been limited by their weakness and their tendency to loosen and/or fracture while in service.

There has been considerable confusion in the industry as to what constitutes a reliable qualification test for threaded pipe connections, which has resulted in too many sales claims reflecting hopes, more than facts. New standard ISO-13679 gives promise to end that problem, in that it allows one to choose the percent efficiency ratings relative to the pipe ratings that a connection is to be tested and qualified for, under combinations of: internal pressure; external pressure; tension; compression; bending; temperature; and the choice of water or gas as the pressurizing fluid. It also specifies test procedures to accurately measure performance capability. Therefore, it is expected that the number of new types of connections offered for sale will decline in face of such stringent standards, but that real progress should accelerate. This application is made with that thought in mind.

BACKGROUND ART

Blose Re. 30,647 discloses Trapped Wedgethreads that suggests a thread seal in Col 2 ln 7–11 but does not teach how to accomplish a thread seal and in fact, cites undefined clearances between roots and crests in Col 3 ln 40–43.

Blose 4,600,224 discloses a trapped wedgethread and cites in Col 1 lines 56–60 that he provides a "controlled clearance between mating roots and crests". Nowhere does he claim a thread seal as he suggested in Re. 30,647, but provides metal-to-metal seals as at 12 of FIG. 1, as at 24 & 26 of FIG. 2, and as at 32 and 34 of FIG. 3 for the three embodiments disclosed.

Blose 4,600,225 adds additional clearance as at 43 between mating threads to further confirm that he was not able to form a wedge thread seal.

Ortloff 4,671,544 further confirms lack of thread sealing attained by the inventions above having a common assignee, in that he provides a resilient seal (26) mid-point the mating threads and metal-to-metal seals as at 22 and 24 of FIG. 1. Col 2 ln 18–20 he mentions that the threads seal but does not teach how. If those threads did seal, then his resilient seal and metal-to-metal seals would not be needed. The embodiment shown in FIG. 4 does not claim a thread seal, but claims a metal-to-metal seal as at 50.

Reeves 4,703,959, discloses a trapped wedgethread connection that seals on a soft seal such as polytetrafluoroethylene in Col 2 ln 6–17. Again, he claims a thread seal but does not teach how to accomplish it. If the threads sealed the contained fluid, the soft seal is not needed.

Blose 4,822,081 discloses a trapped wedgethread but nowhere does he claim a thread seal, having no doubt witnessed tests on several of his inventions listed above. Instead, he cites seals as at 51 and 54.

Mott 5,454,605 depicts a trapped wedgethread described in Col 2 ln 48–61 and illustrated in FIGS. 3 & 4. He properly describes the assembly and disassembly problems and the damage susceptibility of dovetail wedge threads in Col 1 ln 51–Col 2 ln 2. In Col 2 ln1 60–65, Col 4 ln 61–Col 5 ln 14, he claims a thread seal but again, does not teach how to seal against even mud. He states, "when made-up, there is no clearance between the threads" so not even thread lubricant is entrapped there between" but unfortunately, such perfect confirmation is and will always be beyond machining capability, and particularly within cost limitations for pipe connections.

Watts 2,766,998 teaches how to form an elastic metallic lip-seal and mating seat so as to effect a high-pressure seal against gas for many years, while under conditions of extreme variations of pressure and temperature.

Watts 5,427,418 teaches the elements that must exist at the position of full makeup for a pipe thread to seal high pressures with thread dope, and depicts a preferred embodiment having a positive included angle. A final judgment has been made that the XLC wedgethread connection made by XL SYSTEMS, INC. infringes '418, and a permanent injunction has been issued. The present application is an improvement over '418 that discloses a workable sealing range ratio for, the radius change to the thread width change, per turn.

Watts PCT Patent Application PCT/US00/28829 teaches that an Open Wedgethread can seal and operate successfully, teaching away from all prior art wedgethread patents cited above. Six of the wedgethread patents cited above have a common assignee and four name a common inventor, which confirms that a long, careful and continuing improvement effort has been focused on wedgethreads for over 25 years. Experience has taught a common characteristic of all Trapped Wedgethreads of other inventors listed above, that the load flanks do not engage but trap dope between them, and that the stab flanks engage and generate a high premature frictional resisting torque, as urged by the pressurized dope in the load flank gap before the ideal position of full makeup is reached, and that the threads do not seal. That premature makeup resisting torque acts to stop rotation short of full makeup, which allows dope in the load flank gap to later leak out when subjected to operational loads and to loosen the connection which in turn, reduces its ability to be driven or to serve as a mechanical support, or to seal. Upon first rotation of such pins into such boxes, both the crest gap (the gap between mating roots and crests) and the load flank gap are very wide, so excess dope flows freely outwardly from the connection. Increased torque begins during the latter stages of makeup when the gap widths between both thread surfaces, are reduced sufficiently that the dope being forced outwardly through the long narrow helical gap begins to seal and thereby, begins to build a progressively increasing back-pressure which in turn, causes frictional resisting torque between mating surfaces on the opposite side of the thread. None of the wedgethread patents by others cited above teach or even mention, the importance of a workable change ratio (CR=the thread diameter change to the crest width change per turn) that is required to result in contact of all mating flanks and a dope thickness in the crest gap so as to: (1) effect a rigid non-loosening connection; (2) effect a thread seal and; (3) maintain both the seal and non-loosening characteristic after being subjected to service forces.

When wedgethreads by others are made up to the Snug Position, the crest gap equals BTD and one flank gap is wider due to the threads' low CR value, and further makeup will cause dope to flow in accord with the laws of hydraulics, radially a fraction of an inch from the crest gap whose long helical path has just then begun to seal, into the wider flank gap and thence helically outwardly from between the mating threads, as the crest gap is reduced to the least thickness (Q), that the threads can compact solids in the dope down to. Then, progressively increasing root-crest interference and its resisting torque begins to build, as the wider flank gap width is progressively reduced which pressurizes the dope therein, and in turn, forces the other set of mating flanks progressively tighter together which begins a second progressively increasing frictional resisting torque. When both resisting torques together, build to equal the maximum makeup-torque applied, rotation is stopped short of the desired position of full makeup, leaving flowable dope in the flank gap instead of wedging all flanks together. Later axial operational forces such as vibration, bending, and thermal changes, cause intermittent flows of dope from the flank gap and in turn, causes leakage through and out of the flank gap which loosens the connection. A subsequent makeup torque applied to the connection in a test laboratory after leakage, may be able to temporarily reseal the flank gap, but it cannot heal a crest gap leak because the crest gap contains no flowable dope. Most importantly, it is usually not possible to apply a subsequent makeup torque in the field. The present application solves those problems by determining and using, a workable CR.

SUMMARY OF THE INVENTION

For purposes of this application, definitions and formulas given below will apply.

Flank angle=The angle in a plane coinciding with the pipe axis and measured in the gap between a thread flank and a plane positioned 90 degrees to the axis, the angle being zero if the flank is perpendicular to the axis: the angle being plus if the flank faces more toward the crest; the angle being minus if the flank faces more toward the root, Included Angle=Algebraic sum of the stab flank angle and the load flank angle.

Thread Turn=A 360 degree portion of a screw thread.

Pin=A male threaded pipe end, the smallest diameter thread turn being the first thread turn.

Box=A female threaded pipe end formed to mate with a pin thread, the largest diameter thread turn, being the first thread turn.

Pin Crest Gap=gap between the pin crest and the mating box root, when assembled.

Box Crest Gap=gap between the box crest and the mating pin root, when assembled.

Wedgethread=A screw thread form having a crest, root, stab flank and load flank, the load flank being formed on a greater helical angle than is the stab flank such that the axial length of the crest is least at the beginning of the first thread turn, the crest length gradually increasing to a maximum axial length at the end of the last thread turn, such that the box and pin may be screwed together to a desired position of full makeup at which, both stab flanks and load flanks contact and wedge against their respective mating flanks, which stops makeup of the connection.

Trapped Thread=A thread with a negative included angle for at least a portion of its flank width.

Open thread=A thread form having no negative included angle over its entire flank width.

Metal-to-metal seal=A non-threaded surface formed completely around a portion of a box or pin that is in continuous contact with a mating surface of the other, so as to effect a seal against fluid from within or from outside the connection.

DT=a variable gap width and dope thickness between mating threads, under given conditions.

Q=Least dope thickness that the dope will compact to between the mating threads, when the dope is free to flow outwardly from between mating surfaces.

HTD=Healing thickness dimension=the minimum gap width between assembled mating thread surfaces, that will allow the dope to flow momentarily and reseal a leak path.

BTD=Bridge Thickness Dimension=the maximum gap width between assembled mating thread surfaces, that the thread dope used will seal.

Angle of Friction=Arctangent of the co-efficient of friction, that acts between two solid bodies as they slide against one another.

Dry Tight Position=Theoretical full makeup position of a box and pin assembled with no thread dope, so as to attain the full Design Radial Interference between box and pin threads.

DRI=Design Radial Interference between the mating threads when at Dry Tight Position.

SP=Snug Position=a partial makeup position at which, the crest gap equals the Bridge Thickness Dimension, and mating stab flanks are in mutual contact.

G=Width of the gap between the load flanks when at Snug position.

Pin wall thickness=A dimension measured radially at mid-length of the engaged threads, extending from the pin thread pitch diameter to the pin bore.

Box wall thickness=A dimension measured radially at mid-length of the engaged threads, extending from the box thread pitch diameter to the box outer diameter.

Stab pitch=axial length between stab flanks, one thread turn apart.

Load pitch=axial length between load flanks, one thread turn apart.

Full-strength connection=a pipe connection that will seal and not rupture under any combination of loads at which, the VME yield stress of any portion of the pin or box is first reached.

RCT=pin crest radius change per turn.

WCT=pin crest width change per turn.

CR=Change Ratio=RCT/WCT

The present invention may be incorporated with any type or size, open or trapped wedgethread embodiments for any service, comprising but not limited to: conventional double-box couplings of larger diameter than the pipe; double-pin couplings; integral joints; flush joints; upset pipe ends; welded on ends; for connecting pipe to heavy wall vessels; for reversibly connecting such as structural members; et al. Open wedgethreads may have advantages over trapped wedgethreads for some uses, such as ease of manufacturing and gauging, more predictable makeup positions, and to minimize handling damage. Trapped wedgethreads may provide better sealing tendencies in certain cases, by preventing radial separation of mating threads subjected to unusual service conditions. Multiple start threads are within the scope of the present invention. The invention may be practiced by selectively using its various features in different combinations as may be best suited for any specific or general application under the claims. It teaches a wedgethread Change Ratio Range that will effect a seal between mating threads by insuring that at full makeup position: all mating flanks are in tight contact such that the threads will not loosen; the crest gap is not too wide for the dope used to seal; the crest gap is not too narrow for dope to flow momentarily, sufficiently to reseal a leak path in the crest gap that may have been opened by operating forces. The radial widths of mating flanks may be equal, the radial widths of the box flanks may be greater than the radial width of the pin flanks, or the radial width of the pin flanks may be greater than the radial width of the box flanks. The included angle may be zero, positive, or negative. The flanks may project radially, or they may slope either way.

CR VALUES IN ACCORD WITH THE PRESENT INVENTION: During the latter stages of makeup, the last gaps left between mating threads are the crest gaps which trap and pressurize dope, and at final makeup position, both sets of mating flanks wedge in firm contact. That crest dope pressure acts radially on mating crests and roots to keep them apart during makeup, which reduces makeup torque. (1) When the included angle is negative, the dope pressure force acting radially on the crest is multiplied by a wedging factor equal to: cotangent (included angle/2+ angle of friction) which at makeup, is applied by axial vector as a bearing pressure between the mating flanks sufficiently for them to seal on the "Q" thickness of dope between them, and hold them together without relative movement that may be urged by operating forces. (2) When the included angle is positive, that root-crest dope pressure acts radially on the crests and roots during makeup to hold them apart against radial interference force which reduces makeup torque, and at position of full makeup, the radial interference force between the box and pin urges both sets of mating flanks into hard wedging contact, and the radial interference force, less the force of the crest dope pressure, is multiplied by the same factor and applied as an axial sealing bearing pressure between mating flanks. (3) When both flanks are perpendicular to the axis, the crest dope pressure holds roots and crests apart and reduces makeup torque, until the tangential wedging force alone, stops rotation and seals the flanks. In every case, crest gaps are finally sealed by a dope thickness no wider than BTD. The calculations below that explain the present invention, comprise some very small dimensions as compared to everyday common measurements, but they are thousands of times the dimensions currently calculated in Nano-Technology, and billions of times dimensions calculated by Quantum Physicists. Such calculations are reliable, because mathematics is a perfect science.

How to determine and apply a proper CR is explained as follows: When a box thread groove is theoretically held still, and the pin thread is backed off through it from the Dry Tight Position (DTP) to the Snug position (SP), change of the pin crest radius as formed=Design Radial Interference (DRI)+ Bridge Thickness Dimension (BTD), and Axial Flank Travel=G. RCT=Radius Change per Turn, and WCT= Thread Width Change per turn, so the number of back-off turns from DTP to SP is: (DRI+BTD)/RCT=G/WCT. Then, CR=RCT/WCT, so back-off CR=(DRI+BTD)/G. When threads are coated with dope and tightened from Snug Position to Tight Position, increase of the pin radius as formed=(DRI+BTD−DT), and the flank travel=(G−Q), so makeup CR=(DRI+BTD−DT)/(G−Q) which equals back-off CR, because CR can't change between back off and makeup. Solve for G=Q (DRI+BDT)/DT, and substitute G into makeup CR. Then: CR=DT/Q; Maximum DT=BTD; Minimum DT=HTD, so Maximum CR=MCR=BDT/Q and Least CR=LCR=HTD/Q. Thus, the value of DRI and radii tolerances cancel out, and do not affect value of CR. Tolerance differences on RCT and WCT between the box and pin are negligible, because they equal CNC machine accuracy of 0.0002"/". If it is desired to make either the box or pin thread depth different from the other by a truncation dimension "TD", then MCR=(BTD−TD)/Q. Values of BTD, HTD and Q for a given dope composition, may be approximated as follows, or may be determined by carefully controlled laboratory tests: BTD=the size of largest solid particle class in the dope, defined by the related sieve opening that it will not pass; HTD=BTD×(the fraction by volume that the total solid particles are, of the dope as made); Q=BTD×(the fraction by volume, that malleable particles are, of the dope as made). Lead, cadmium and copper are malleable, but graphite and oil aren't. Example using API 5A2 Mod: BTD=0.006"; HTD=0.006"×0.27=0.0016"; Q=0.006"×0.1= 0.0006".

In selecting a CR value within a given range, it is helpful to first choose WCT low enough so that RCT will not be unnecessarily high for a CR within the range. To guide selection of WCT, it is helpful but not mandatory that: WCT be set at a practical value; CR be selected between LCR and MCR; and then RCT=WCR/CR. Threads having a CR slightly less than LCR or slightly greater than MCR may seal temporarily, but are not likely to maintain a seal under service conditions. When the included angle is negative, dope pressure generated in the crest gap during last stages of makeup, pushes root and crest apart, and pushes mating flanks toward each other until flanks wedge tightly which in turn, stops makeup short of the ideal makeup position a fraction of a turn=2×tan (included angle/2)×DT/WCT.

MAKEUP STAGE A: At Snug Position, a first flank gap (typically the stab flank gap) has closed, because sliding action between them has sheared off all dope not in minute surface crevices and extruded it into the crest gap against very low pressure, from the first flank gap. The second flank gap width is less than BTD so it has begun to seal and therefore, dope is restrained from flowing helically out of the second flank gap through its long partially sealed length, but it can easily flow radially a fraction of an inch into the wider crest gap of lower pressure. As makeup progresses, the second flank gap will be reduced to "Q" width as grease and fine powdered solid particles flow out around the malleable solid particles that are being compacted between the gap surfaces to "Q" thickness. The dope left between mating flanks will maintain a seal, because it is securely wedged tightly between the flanks. However, such a dope thickness in a crest gap can not maintain a seal because it is not tightly wedged, but is subject to thermal, mechanical, and fluid pressure wall flexures, so even a brief transient vibration can cause relative movement between root and crest that can disturb the thin layer of solid particles, create a leak path and allow leakage, because no flowable dope is present to reseal (heal) the crest leak path.

MAKEUP STAGE B: After the last flank gap closes, there is no wider gap for dope to flow into from out of the reducing width of the crest gap, so the remaining solid particles are restrained from flowing out through its long narrow helical gap by the larger mashed and progressively sealing solid particles. However, most of the oil (and/or grease) flows out while most of the solid particles dam up behind the clamped larger particles and are retained as sealing agents, to result in a dope thickness intermediate BTD and HTD, as controlled by a workable CR value per the present invention.

As shown above, LCR=HTD/Q and MCR=BTD/Q, which establishes a first CR range between LCR and MCR. For general service, use of a CR second range comprising the middle three-fourths of the first CR range, will tend to offset minor variations in the dope composition and service conditions. If it is desired to market a product-line best suited to dope having a specially designed mixture of solid particle sizes, then a third CR range comprising any portion of the first range may be used, as dictated by that mixture. For extreme pressures and/or high temperature service, a reduced CR range towards LCR may best serve with closer machining tolerances, such as for small diameter threads that have shorter helical passages, to result in a crest gap of less width. Conversely, a reduced CR range toward MCR may best serve to allow wider makeup tolerances for low pressure, non-critical service connections.

To applicant's best knowledge and belief, no wedgethread patents teach CR values within the ranges defined by my Formulas, but even if one randomly fell within the range without the CR feature being recognized and taught as an advantage, then invention was not effected thereby. All connections sold as a product line and/or all connections used in any given piping system, must seal and not loosen for the system to operate safely and properly, be they in an oil well, a chemical plant, a school building or an office building, so if only a few connections in a piping system do not fail, no practical use is effected for the system. For instance, in an oil or gas well there are several strings of pipe that vary in diameter, wall thickness, and depth, and they are often of different designs and made of different metals. Further, the hundreds of connections in each string may be of several different connection types, so many different pipe connections are required to complete a well and should even one leak or loosen, then danger, fire, explosion, damage to the environment, loss of the well and/or extreme expense may result. During applicant's fifty years in product design, manufacture and application of pipe connections, he has observed many mistaken product changes by persons who didn't know why a product worked, so they unintentionally changed the product to not work. Therefore, just having accidentally or randomly included a specific feature, does not advance the art unless that use also explained the feature so it could be understood and used "by those skilled in the art".

Wide stab flanks and generous radii of the preferred embodiment are made possible by my relatively steep tapers. When lowered into the box for assembly, the pin stab flank rests upon the mating stab flank of the box to support the pipe joint being installed, which also positions the pin over halfway into the box as taught by my patent U.S. Pat. No. 5,018,771, such that alignment is automatic, and such that cross-threading cannot occur as Mott described in '605. CR values as defined above, have influence on the thread taper and ideally, the taper should increase with an increase of wall thickness as necessary to prevent excessive thread length, and my CR ranges allow for reasonable selection of the CR value for a given design. To prevent taper lockup between pin crests and box crests when the pin is stabbed into the box, it is preferred that the crests and roots be positioned parallel to the pipe axis, as is well known in the art. Differences in the load flank axial pitch and the stab flank axial pitch for a given diameter thread, define the tangential wedging angle between adjacent flanks which if too great, the threads may loosen and leak, but if too small, the connection may stop far short of the desired position of full makeup. A trial WCT value may be found by my formula given below for the value "J", and trial values for the load flank axial pitch and the stab flank axial pitch may be found by my formulas for "LF" and "SF" respectively, to approximate their final values within the proper CR range.

Mating flank widths of the box and pin may be equal, or one flank may have a greater radial width than the other. When mating flank widths are equal, then the resulting box crest gap will equal the resulting pin crest gap. If mating flank widths are not equal, preferred values are defined in my formulas given below as "S" and "B". To minimize effects of localized crest damage too small to notice visually during assembly, the present invention teaches that the thread flank widths may be dimensioned and toleranced such that the pin flank widths are less than the box flank widths such that upon assembly, the pin crests which are most subject to damage, are held apart from the box roots so as to prevent galling there between. It is within the scope of the present invention for the box flank widths to be less than the pin flank widths such that the pin roots are held apart from the box crests, but this damage prevention feature would be lost along with the best sealing configuration, explained as follows: At the small diameter end of thread engagement, the axial length of the box crest of a wedgethread is necessarily much longer than the axial length of the pin crest, so my preferred embodiment provides that the longer length box crest defines a lesser gap width to minimize leak tendency where fluid pressure is typically the greatest, and that the shorter pin crest length defines a wider gap, but not wider than the bridge thickness dimension. So as to make the box and pin conform circumferentially to each other, a predetermined amount of radial interference is recommended between the box and pin threads, sufficient to generate an optimum tension hoop stress in the box and optimum compressive hoop stress in the pin. Should makeup hoop stress be excessive, then the box rating against internal fluid pressures and the pin rating against axial loads could be reduced, because such stresses are additive to hoop and axial stresses generated by fluid pressures and axial loads. Therefore, an optional feature of the present invention teaches that the preferred diametrical interference between the mating box and pin threads should approximate the quantity: ⅕ of the pipe O.D. times the pipe material yield stress, divided by the pipe material modulas of elasticity. For best performance, interference should extend all along the helical thread length between both ends of the engaged threads, and the interference stress should be considered when diameter and taper tolerances are specified. Such controlled interference will allow service near maximum ratings, and will also lessen the tendency for wedgethread flanks to engage prematurely.

For extreme service requirements or because a user specification requires it, metal-to-metal seals to augment the thread seal may be provided adjacent either or both ends of the engaged threads. Such a sealing surface positioned adjacent the pin end for cooperation with a mating sealing surface formed within the box adjacent the small diameter end of the box threads, will reduce the sealing diameter against internal fluid pressure and thereby, reduce both the axial and circumferential fluid pressure loads on the connection. It may be required to provide a metal-to-metal seal adjacent the large diameter end of the mating threads, by forming an inner diameter surface of the box adjacent it's face, for cooperation with a mating sealing surface formed around the pin adjacent the large diameter end of the pin threads. Such an external seal will provide maximum resistance against external fluid pressure, and may also be required to prevent external corrosion of the threads in some cases. When such seals are required in a flush-joint connection, then the wall thickness required for the seal lip thickness is lost to use for mechanical strength of the connection, however, by use of In-Process-Swaging taught by my patent U.S. Pat. No. 5,516,158, a full strength near-flush connection may be had at a cost much lower than costs for upset or full swaged connections. Another optional feature of the present invention to enhance a connection's strength, sealability and cost, is to dimension the axial length of the engaged threads and their crest lengths a practical minimum, and maximize the number of thread turns within that length of thread engagement, which is accomplished by dimensioning the least axial crest length of the first pin thread turn to be substantially equal to the least axial crest length of the first box thread turn. My formulas given below for the mean axial pitch labeled "A" will allow future designers to determine such dimensions for any size connection. Then, based on the value of "A", the stab flank lead and the load flank lead may be found by my formulas for "SF" and "LF" respectively shown below. Thus, other non-workable, wasteful and/or dangerous products may be avoided.

To effect a thread seal, the gap width existing between crests and roots after mating flanks wedge in firm contact, must not exceed the bridge thickness dimension. In the preferred embodiment of the present invention, that gap width is controlled by the radial width of the stab flanks and the radial width of the load flanks, the previously mentioned pin-box radial interference being maintained. It is easy to say that a pin crest contacts the box root exactly when the box crest contacts the pin root, but machining tolerances prevent such from happening and to even approach that idealistic condition, would be excessively expensive for the manufacture of pipe connections. Therefore, a maximum gap width must be defined and not exceeded in practice, for the threads to be able to seal, as explained above. In keeping with standard production practice, the target gap width is preferable but not mandatory, midway between BTD and HTD.

Another optional feature of the present invention is explained as follows: When mating wedgethreads having a zero included angle are being wedged tightly together, there is no tendency for threads to be forced out of their mating grooves by excessive torque. Wedgethread radial interference is effected by root-dope-crest interference before and independently of the final torque magnitude, which can occur only when mating flanks wedge. There are service applications for open type wedgethreads that do not require maximum torque resistance, that my previously described embodiments can provide, and for them, the following optional embodiment has certain advantages, such as to improve thread cutting tool geometry in certain instances, such that the flanks may be formed with an included angle that is greater than twice the angle of friction. The axial wedging force on the flanks, due to makeup torque, is many times greater than the force of interference between roots and crests, because of the very small helically configured wedging angle between flanks. The radial vector of the axial force between mating flanks equals: the wedging force times, tangent [included angle/2− angle of friction]. It is therefore evident that no such force will exist if the included angle does not exceed twice the angle of friction between the flanks, however, premature lockup may occur when interference forces the mating threads together that have an included angle less than twice the angle of friction. Should it be desired that a positive included angle exceed twice the angle of friction, then engineering calculations must first confirm that box and pin walls are thick enough to retain that force without being overstressed, before such an included angle is used. A zero-degree included angle is preferred to eliminate any concern of such separating tendency, but wedgethreads having positive or negative included angles are clearly within the scope of the present invention. When trapped or open wedgethreads are made in accord with the present invention, it is preferred but not mandatory, that the included angle have an absolute value greater than twice the angle of friction for the dope used, to prevent premature thread lockup.

When a given threaded connection is to be used in accord with the present invention, a suitable pipe dope having both large and small solid particles suitable to seal and lubricate between the threads should be available for use on the threads. Such a dope should have large, solid, malleable particles whose breadth is no less than the widest root-crest gap that may be formed between the assembled threads, and whose combined volume is more than $1/200$ of the dope volume as made so as to seal the root-crest gap sufficiently, but less than $1/20$ of the dope volume as made so as to prevent excess entrapment of the large particles between the mating flanks and thereby keep mating flanks from engaging in firm contact which in turn, will allow the connection to loosen and leak after being placed in service. To prevent excess entrapment of all solid particles between the mating threads, the volume ratio of all solid particles to the dope volume as made, should not exceed the ratio of the minimum root-crest gap to the maximum root-crest gap that may exist between the mating threads.

Thus, it is now clear that the present invention teaches how to provide a cost-effective, high strength wedgethread pipe connection that may be easily and repeatedly assembled very close to a desired position of full make-up within a wide torque range, so as to effect and maintain high pressure gas and/or liquids seals while simultaneously preventing loosening by service conditions, and can also heal its crest seal even though the connection is subjected to extreme operating loads such as transient vibrations, mechanical loadings, fluid pressures and/or thermal changes.

Preferred dimensions for my wedge threads not taught heretofore by background art, may be determined per the following formula, however, the scope of the present invention is not intended to be limited thereby.

O.D.=the pipe outer diameter
D=Pipe design O.D.=the mean diameter within the O.D. tolerances for pipe ends.
P.D.=the thread pitch diameter, as generally used in engineering and manufacturing.
BL=Desired box thread P.D. at largest diameter of thread engagement.
BS=Desired box thread P.D. at smallest diameter of thread engagement.
T=Conical thread taper=diameter change/axial length
L=Length of engaged threads=(BL−BS)/T
J=Load flank axial pitch−Stab flank axial pitch=0.0025+D/2800=ANSI "RC5" Fit, when at one turn short of full makeup position.
W=Radial width of pin load flank=<t/6=<axial length of $1^{st}$ thread crest
A=Mean axial pitch=W+(WA^2+J×L)^0.5
LF=Load Flank axial pitch=A+J/2

SF=Stab Flank axial pitch=A−J/2
N=Number of Thread turns=L/A
S=Radial width of pin stab flank=W+A×T/2
B=Radial width of box load flank=W+0.003"
C=Radial width of box stab flank=S+0.003"
Y=Connection material unit yield strength
E=Connection material modulas of elasticity
M=Preferred thread interference on diameter=0.2×D×Y/E
PS=Pin thread P.D. at small end of thread engagement= BS+M
PL=Pin thread P.D. at large end of thread engagement= BL+M
PB=Pin bore
PR=Poisson's ratio for pipe material
R=Ratio of, Box wall thickness to Pin wall thickness
BCS=Box axial compressive stress limit=M×E/[PR×D×(R+1)]
PTS=Pin axial tension stress limit=R×BCS

DETAILED DESCRIPTION OF PREFERRED EMBODIMENTS

Figure 1:
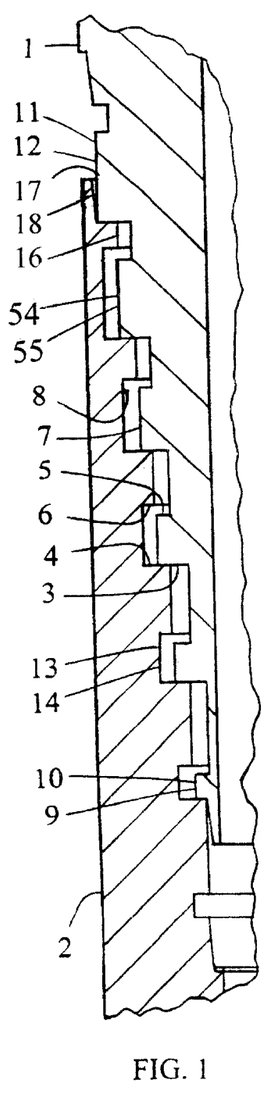
FIG. 1 depicts a fragmentary section of a box and pin of the connection at stab position.
Figure 9:
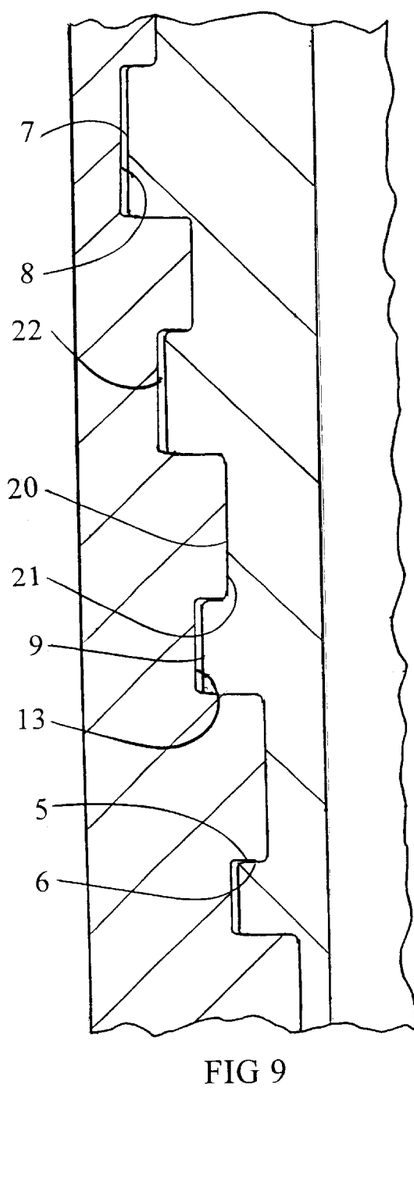
FIG. 9 from FIG. 2, depicts a bridge thickness dimension of a pin crest gap width.

FIG. 1 depicts Pin (1) at stab position within Box (2) such that helically configured pin stab flank (3) and the weight of the pipe joint it is formed on, is supported by helically configured box stab flank (4). Pin load flank (5) and box load flank (6) are not then in contact with each other. Stab position is attained by lowering the pin into the box without rotation, wherein thread turns of the pin, pass downwardly through thread turns of the box until the pin stab flank of each turn contacts a box stab flank turn too small in diameter for it to pass through, such that the pin stab flank rests on the box stab flank, and pin crest (7) is in horizontal alignment within box root (8). Both roots and crests are preferably formed parallel to the connection axis so as to prevent taper lockup during stabbing, and also to provide a wider stab flank. Axial length (9) and diameter (10) of the pin thread crest are least at their lower beginnings, gradually increasing to maximum axial length (11) and maximum diameter (12) at their upper endings. At stab position, axial length (13) of box root (14) is a constant amount of length greater than then adjacent axial length (9) of pin crest (7) such that when the pin is rotated to makeup the connection, slippage occurs between stab flanks and the pin thread crest moves helically downwardly and outwardly toward the box root, and toward the full make-up position shown in FIG. 2, pin thread flanks wedge between the box thread flanks because then adjacent lengths (9) of the pin thread crests and (13) of box roots become substantially equal, and pin load flank (5) abuts box load flank (6) with a "Q" thickness of dope between, which stops rotation at the desired position of full make-up. Before such wedging occurs, dope is trapped and pressurized between both sets of roots and crests and in the second flank gap, and radial interference between pin thread root (20) and box crest (21) begins and progressively increases via pressurized dope between them, and gap width (22) no wider than BDT, is formed between pin crest (7) and box root (8) as shown in FIG. 9, both gap widths being intermediate HTD and BTD, because the CR is in accord with the present invention. The radial width of stab and load flanks of both box and pin are dimensioned and toleranced such that the width of gap (22) as shown in FIG. 9 at the position of full make-up, is no greater than the bridge thickness dimension. A crest may be truncated so the box or pin thread depth is less than the mating thread depth.

Figure 2:
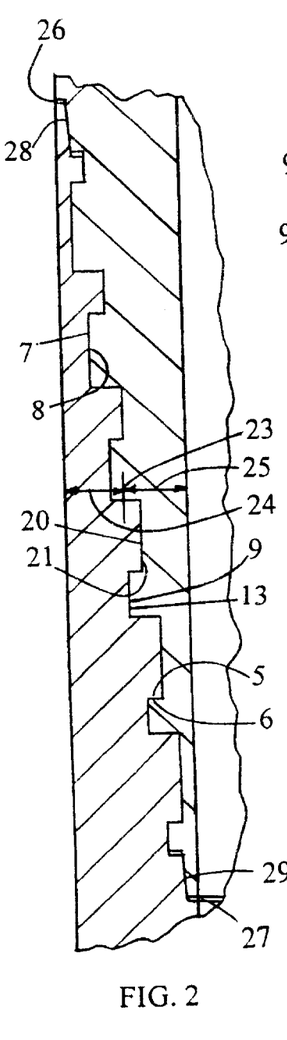
FIG. 2 depicts the connection of FIG. 1 at the position of full make-up.

As seen in FIG. 2 at mid-length of thread engagement (23), the box thickness is measured radially between the thread pitch diameter and box O.D. as at (24), and the pin thickness is measured radially between the thread pitch diameter and the pin I.D. as at (25). Axial space may be formed where needed as at (26) and (27) to relax end-length tolerances while insuring that the shoulders will not abut before the flanks become tightly wedged.

Figures 3, 4, 5, 6, 8:
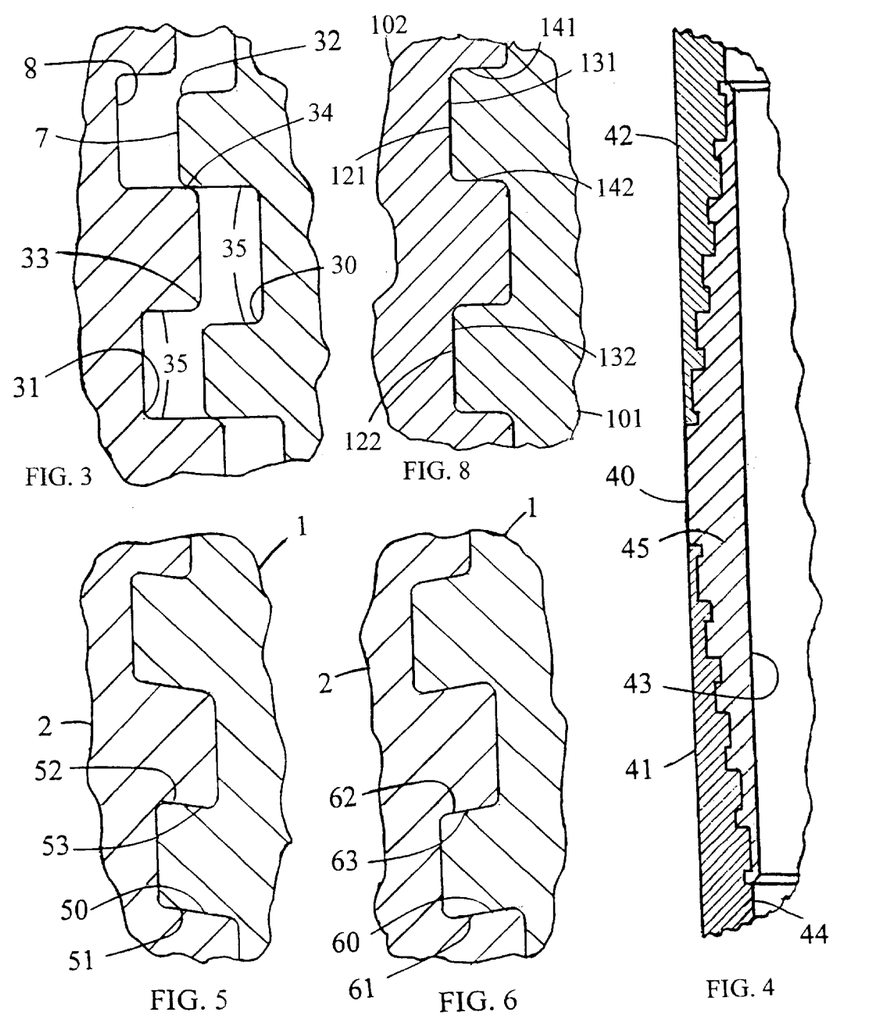
FIG. 3 depicts an enlarged fragmentary thread section taken from FIG. 1.
FIG. 4 depicts a fragmentary section of another embodiment using a double-pin coupling.
FIG. 5 depicts a fragmentary section showing a variation of the flank angles.
FIG. 6 depicts a fragmentary section of another variation of the flank angles.
FIG. 8 depicts a fragmentary section formed with cylindrical Open wedgethreads.
Figure 7:
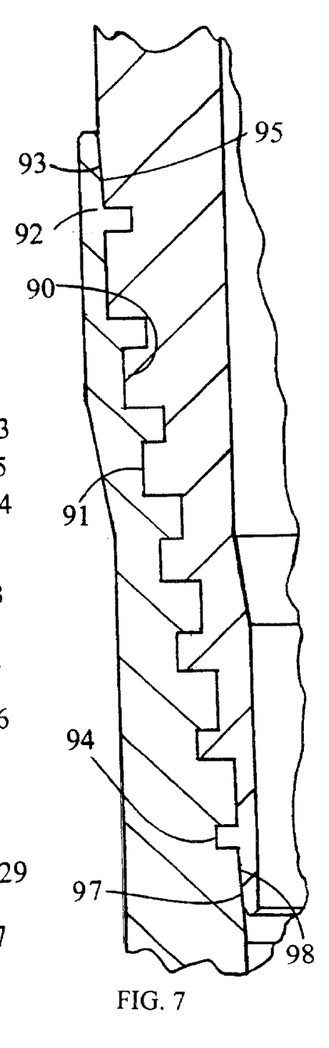
FIG. 7 depicts a section of a swaged pin and box after assembly.

Although a wedgethread connection built in accord with this invention will seal against high pressure gas, when special user specifications require or when it is necessary to minimize the fluid pressure load, then mating metal-to-metal sealing surfaces may be selectively provided as at (28) and (29) of FIG. 2, or at (93) and (97) of FIG. 7 or similarly, for the embodiment depicted in FIG. 4. Such seals may comprise cylindrical or conical surfaces wherein pin-sealing surface (93) of FIG. 7 is made slightly greater in diameter than mating box sealing surface (95) so as to effect an interference fit upon assembly. Pin surface (97) may likewise be of slightly greater diameter than is mating box surface (98). Radial sealing surfaces as at (26) and (27) on the box and pin that seal when abutted, are within the scope of this invention however, much closer tolerances are required.

The enlarged thread form detail of FIG. 3 depicts generous concave radii (30) joining the pin root to flanks, and like radii (31) of the box that are typically but not necessarily, about 15% of the load flank radial width to both reduce stress concentration and greatly reduce damage during handling, transport, storage and assembly, as compared to the damage susceptibility of sharpedged trapped wedgethreads. Threads formed per FIG. 3 also provide a stable support by contact of the stab flanks as at (34) for the pipe joint being stabbed, to avoid the tedious handling required during assembly of conventional wedgethread connections described by Mott, and they also provide axial and concentric alignment of the connection to automatically register pin crests with longer box roots, so as to assist proper assembly required to assure a reliable connection. Included angle (35) may be a negative or positive or it may be zero degrees. If the absolute value of the included angle is less than twice the angle of friction but not zero, the flanks may lockup prematurely, short of the desired position of full makeup. The angle of friction for API 5A2 Modified dope is 1.2 degrees. To avoid problems caused when dope dries out, as by elevated temperature which reduces its lubricity, it is preferred that the included angle be no less than four times the angle of friction, so as to allow easy dis-assembly at some later time.

When load flanks are formed parallel to the stab flanks such that included angle (35) in FIG. 3 equals zero, to improve dimensional accuracy and to reduce costs to manufacture and inspect the connection, it provides a cost-effective wedgethread connection not hitherto available. For general application, both flanks are formed preferably at 90 degrees to the axis, but not necessarily. For instance, when box wall thickness (24), and pin wall thickness (25) dimensions are reasonably close, then the box and pin will contract and expand equally during makeup and when under superimposed loads without need of a reserve radial restraining strength of the tubular member that the threads are formed on, to prevent separation of the mating threads which would in turn, allow leaking and/or jumpout.

Should the box and pin thickness difference be extreme and the axial load be so near the rated load, that the radial thread interference in the thinner wall member is overcome by the radial force causing differential diametrical strain, then stab flanks (50), (51) and load flanks (52), (53) may slant upwardly away from the axis per FIG. 5 when tension loads are of greatest importance for a given application, or stab flanks (60), (61) and load flanks (62), (63) may slant downwardly away from the axis per FIG. 6 when compressive loads are of greatest importance for another application. In either case, they should slant at an angle sufficient to resist radial mechanical forces that would otherwise cause differential strain, to thereby prevent separation of the mating threads. When high loadings in both tension and compression are imposed on such unequal box and pin wall thicknesses both flank angles being negative may best serve.

Although the preferred value of the included angle (35) is zero for general use, a positive included angle may serve best in certain cases, such as to improve thread cutting tool geometry or for manufacture on machines not having the full flexibility of modem threading machines. When the included angle is positive, the tendency of the wedging force to expel the threads out of their mating grooves increases directly as: tangent (included angle/2− angle of friction). In such a case then, both box and pin wall thicknesses must necessarily provide a reserve restraining force greater than the expelling force, so as to prevent separation and withstand all other operating loads, while not overstressing the tubular walls on which the threads are formed.

Figure 10:
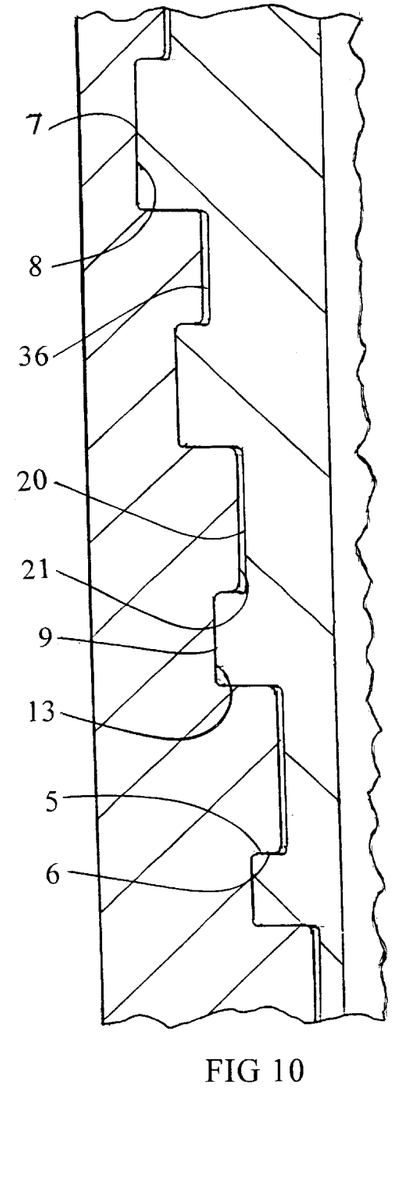
FIG. 10 from FIG. 2, depicts a bridge thickness dimension of a box crest gap width.

FIG. 10 is a fragmentary central section taken from FIG. 2 which depicts an alternate embodiment to the embodiment of FIG. 9, wherein pin crests and box roots interfere upon makeup, and wherein gap (36), having a width no greater than the bridge thickness dimension, is formed between the pin roots and the box crests. This embodiment may be used in services for which, damage prevention advantages explained for the embodiment of FIG. 9 are not required.

The present invention teaches the importance and use of a workable Change Ratio so as to prevent loosening and leakage of a wedgethread connection, even after it is subjected to later service loads such as extreme transient vibrations, accidental impacts and temperature changes. The following example uses API 5A2 Modified dope, but it can be applied to any thread dope, after determining the BTD, HTD and Q values for that dope. The Maximum CR=MCR= BTD/Q=0.006"/0.0006"=10, and the Least CR=LCR=HTD/ Q=0.0016"/0.0006"2.67, which establishes a first CR range of 2.67 to 10. So as to partially offset effects of dope composition variations and service condition variations, the first range may be reduced by one-eight at each end, to a second CR range of 3.6 to 9. If a product line for use with wider dope tolerances is desired, the first range may be reduced to a third CR range anywhere between 2.67 and 10. However, the full range may be used if tolerances, dope composition, and services are sufficiently constant. Using my formula for Ideal WCT, a WCT value may be selected, and then based on application characteristics, the designer may easily choose a value for CR within the range, and know that his connection will seal but not loosen or leak after being subject to service loads.

I claim:

1. A threaded pipe connection for assembly with the use of thread dope, having a box (2) and pin (1) formed with tapered mating wedgethreads, the box threads having crests (21), roots (8), stab flanks (4) and load flanks (6), the pin threads having crests (7), roots (20), stab flanks (3) and load flanks (5), an included angle (35) measured in the gap between the flanks, the threads having a first axial crest width as at (17) and a second axial crest width as at (54), the first and second crest widths being positioned one thread turn apart, first crest width (17) being dimensioned with first radius (18) and second crest width (54) being dimensioned with second radius (55), comprising: the first crest radius minus the second crest radius being a first quantity; the first crest width minus the second crest width being a second quantity; the first quantity divided by the second quantity being a third quantity; a bridge thickness dimension that is the widest gap width the dope can seal between the mating threads; a least thickness dimension that the dope can be compacted to between the mating threads; a healing thickness dimension that is the least gap width the dope can flow within to heal a leak; the third quantity having a high limit equal to the bridge thickness dimension divided by the least thickness dimension; the third quantity having a low limit equal to the healing thickness dimension divided by the least thickness dimension; a first range for the value of the third quantity being defined between the high limit and the low limit; the connection being formed with its third quantity being within the first range.

2. The pipe connection of claim 1, further comprising: the first range being reduced by one-eight at each end thereof, to thereby define a second range equal to three-fourths of the first range, so as to negate effects of variations in the thread dope composition; the connection's third quantity being within the second range.

3. The pipe connection of claim 1, further comprising: the first range being reduce to a third range within any portion of the first range, to thereby define a third range that is adjusted to special dope formulation tolerances; the connection's third quantity being within being the third range.

4. The connection of claim 1, further comprising: the included angle (35) being a negative angle.

5. The connection of claim 4, further comprising: the negative included angle (35) having an absolute value greater than twice the angle of friction that acts between mating flanks.

6. The connection of claim 1, further comprising: the included angle (35) being zero degrees.

7. The connection of claim 1, further comprising: the included angle (35) being a positive angle.

8. The connection of claim 1, further comprising: the included angle (35) having a value more than twice the angle of friction that acts between mating flanks.

9. The threaded connection of claim 8, further comprising: upon makeup of the connection, the mating flanks exert a wedging force against each other, the wedging force having both an axial component and a radial component; box wall (24) and pin wall (25) having sufficient reserve strength, in addition to strength required to withstand makeup torque and all operating loads without the walls becoming stressed higher than the limiting design stress, sufficient to prevent separation of the mating threads urged by the wedging force.

10. The connection of claim 1, further comprising: diameters of box root (8) and pin crest (7) being dimensioned such that shortly before the position of full makeup is attained during makeup, an increasing radial force is initiated and transmitted via dope trapped between the pin root (20) and box crest (21) sufficient to establish radial interference between box and pin such that at the position of full make-up, a desired magnitude of radial interference exists between the box and pin threads so as to maintain their interference with each other, such that a gap exists between pin crest (9) and box root (13) of a magnitude no greater than the bridge thickness dimension, the gap being filled with dope.

11. The connection of claim 1, further comprising: diameters of pin root (20) and box crest (21) being dimensioned such that shortly before the position of full makeup is attained during makeup, an increasing radial force is initiated and transmitted via dope trapped between box root (8) and pin crest (7) sufficient to establish radial interference between box and pin such that at the position of full make-up, a desired magnitude of radial interference exists between the box and pin threads so as to maintain their interference with each other, such that a gap exists between box crest (21) and pin root (20) of a magnitude no greater than the bridge thickness dimension, the gap being filled with dope.

12. The connection of claim 1, further comprising: there being no full length helical gap between the mating threads, wider than the bridge thickness dimension after the connection is tightened.

13. The connection of claim 1, further comprising: a desired magnitude of radial interference between the mating threads upon makeup of the connection, extending substantially along the full length of thread engagement.

14. The connection of claim 1, further comprising: the connection being dimensioned for use with API 5A2 Modified thread dope; the value of the third quantity being not less than 2.67 and not greater than 10.

15. The connection of claim 1, further comprising: the mating wedgethreads having a predetermined axial length of thread engagement, the threads having a stab flank axial pitch length and a load flank axial pitch length, comprising: the least axial length (9) of the pin crest (10) being dimensioned substantially the same magnitude as the least axial length of the box crest (16), so as to maximize the number of thread turns within the desired length of thread engagement, for that least axial crest length.

16. The connection of claim 1, further comprising: the threads having a stab flank axial pitch length and a load flank axial pitch length; the axial pitch length of the load flank (5) minus the axial pitch length of the stab flank (3), being substantially equal to the sum of 0.0025 plus, 0.00036 times the outer diameter of the pipe, all dimensions being in inches.

17. The connection of claim 1, further comprising: all crests and roots being positioned parallel to the connection axis.

18. The connection of claim 1, further comprising: the radial width of the box flanks being different in dimension than the radial width of the mating pin flanks by less than the bridge thickness dimension, such that upon assembly, neither crest gap is greater than the bridge thickness dimension.

19. The connection of claim 1, further comprising: stab flanks (4) having a constant axial pitch length, load flanks (6) having a constant axial pitch length greater in magnitude than the stab flank axial pitch length, a mean axial pitch length being equal to the mathematical average of the stab flank and load flank axial pitch length, least axial length (9) of the thread crest at the beginning of the first thread turn (10) being a first dimension, the load flank axial pitch length minus the stab flank axial pitch length being a second dimension, comprising: the mean axial pitch length being substantially equal in magnitude to the quantity, the square of the first dimension, plus the second dimension, times the length of engaged threads, all raised to 0.5 power, plus the first dimension.

20. The connection of claim 19, further comprising: the load flank axial pitch length being substantially equal to the quantity, the mean axial pitch length plus one-half of the second dimension; the stab flank axial pitch length being substantially equal to the quantity, the mean axial pitch length less one-half of the second dimension.

21. The connection of claim 20, further comprising: the radial width of the box stab flank (4) being substantially equal to the quantity: one-half of the mean axial pitch length times the thread taper, plus the radial width of the load flank (5).

22. The connection of claim 1, further comprising: the pin having an external sealing surface (97) formed around its periphery adjacent the small diameter end of the thread so as to cooperate with a mating sealing surface (98) formed within the mating box adjacent the small diameter end of the thread and thereby form a metal-to-metal seal against fluid pressure from inside the connection.

23. The connection of claim 1, further comprising: the pin having an external sealing surface (93) formed around its periphery adjacent the large diameter end of the thread so as to cooperate with a mating sealing surface (95) formed within the mating box adjacent the large diameter end of the thread and thereby form a metal-to-metal seal against fluid pressure from outside the connection.

24. A thread dope composed of a grease-like material mixed with solid particles sufficient to seal and lubricate between given mating pipe threads, comprising: a portion of the solid particles being malleable solid particles whose breadth approximately equals the maximum root-crest gap width that may exist between the assembled threads; the dope also having smaller solid particles; the combined total volume of all solid particles, divided by the dope volume being a first ratio; the first ratio multiplied by the maximum root-crest gap width, being substantially equal to the minimum root-crest gap width that may exist between the mating threads.

25. The invention of claim 24, further comprising: the first ratio being no more than 1/20 and not less than 1/200.

26. The connection of claim 1, further comprising: the dope being a mixture of grease-like material mixed with solid particles sufficient to seal and lubricate between the mating threads; a portion of the solid particles being malleable solid particles whose breadth approximately equals the bridge thickness dimension; the dope also having smaller solid particles; the combined total volume of all solid particles divided by the dope volume being a first ratio; the first ratio multiplied by the bridge thickness dimension, being substantially equal to the minimum root-crest gap width that may exist between the mating threads.

27. A threaded connection for assembly with the use of thread dope, having a box (2) and pin (1) formed with tapered mating wedgethreads, the box threads having crests (21), roots (8), stab flanks (4) and load flanks (6), the pin threads having crests (7), roots (20), stab flanks (3) and load flanks (5), and included angle (35) measured in the gap between the flanks, the threads having a first crest width as at (17) and a second crest width as at (54), the crest widths being positioned one thread turn apart, first crest width (17) being dimensioned with first radius (18), and second crest width (54) being dimensioned with second radius (55), comprising: the first crest radius minus the second crest radius being a first quantity; the first crest width minus the second crest width being a second quantity; a bridge thickness dimension that is the widest gap width the dope can seal between the mating threads; a healing thickness dimension that is the least gap width the dope can flow within to heal a leak; the first quantity divided by the second quantity being less than, two-thousand times the bridge thickness dimension, and more than two-thousand times the healing thickness dimension.

* * * * *